(12) United States Patent
Foulks et al.

(10) Patent No.: US 10,585,675 B2
(45) Date of Patent: Mar. 10, 2020

(54) SYSTEMS AND METHODS OF RUNNING DIFFERENT FLAVORS OF A SERVICE PROVIDER IN DIFFERENT HOST ENVIRONMENTS

(71) Applicant: EMC IP Holding Company LLC, Hopkinton, MA (US)

(72) Inventors: Robert Andrew Foulks, Nashua, NH (US); Shyamsunder Singaraju, Westborough, MA (US); Amitava Roy, Lexington, MA (US); Rajesh Kumar Gandhi, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 15/797,640

(22) Filed: Oct. 30, 2017

(65) Prior Publication Data
US 2019/0129722 A1 May 2, 2019

(51) Int. Cl.
*G06F 9/445* (2018.01)
*H04L 29/08* (2006.01)

(52) U.S. Cl.
CPC .......... *G06F 9/445* (2013.01); *G06F 9/44505* (2013.01); *H04L 67/1097* (2013.01)

(58) Field of Classification Search
None
See application file for complete search history.

(56) References Cited

U.S. PATENT DOCUMENTS

| 7,653,914 | B2 | 1/2010 | Krohn et al. |
| 7,950,023 | B2 | 5/2011 | Scougall et al. |
| 9,521,610 | B2 | 12/2016 | Lin et al. |
| 2004/0242329 | A1 | 12/2004 | Blackburn et al. |
| 2005/0182825 | A1 | 8/2005 | Etychison |
| 2016/0087910 | A1* | 3/2016 | Mittal ................ H04L 67/32 709/226 |

* cited by examiner

*Primary Examiner* — Scott B Christensen
(74) *Attorney, Agent, or Firm* — BainwoodHuang

(57) ABSTRACT

Improved techniques for running different flavors of a service in different host environments. Each service is defined by a service type and host environment in which the service can be run. The techniques employ a service loader for obtaining the service type and host environment data, and loading a service flavor based on the service type and host environment data. By providing a service loader that, in response to a service request, can access host environment data from an operating system, access metadata describing host environments in which service objects for an application can be run, and determine which service flavor to load based on the service type and host environment data, appropriate service flavors can be loaded onto a system while avoiding application hanging and/or errors conditions due to a mismatch between a current host environment and the host environments in which a service object can be successfully run.

23 Claims, 4 Drawing Sheets

SYSTEMS AND METHODS OF RUNNING DIFFERENT FLAVORS OF A SERVICE PROVIDER IN DIFFERENT HOST ENVIRONMENTS

BACKGROUND

In a service-oriented architecture environment, a service consumer generally sends a request message for a service to a service provider. The service provider receives the service request message, processes the service request message, and returns a corresponding service response message to the service consumer. The service consumer includes a service loader, which obtains a type of the service, generates a service description based on the service type, and initializes a runtime for the service in accordance with the service description, thereby allowing the service consumer to utilize the service represented by the service type.

SUMMARY

In a storage system environment, a data storage system can employ a service-oriented architecture to obtain, or otherwise load at runtime, one or more service objects for a storage system application, such as a runtime application, a test application, a demo application, etc. The service-oriented architecture can have drawbacks, however, when employed in the storage system environment. For example, an application developer or quality assurance (QA) specialist may wish to run a test application on a data storage system that does not have access to a backend array (i.e., the physical storage of the data storage system). However, service providers in a typical service-oriented architecture environment may be unaware that the data storage system upon which the test application is to be run has no access to a backend array. As a result, when the test application attempts to make contact with the missing backend array, the test application may hang awaiting a response from the backend array or simply issue an error condition.

Improved systems, methods, and techniques are disclosed herein for running different flavors of a service provider in different host environments. As employed herein, the term "service provider" can refer to a specific implementation of a service, and the term "flavor" can refer to a specific implementation of a service tailored to run in a specific environment. Each service is defined not only by a service type, but also one or more host environments in which the service can be run. The disclosed techniques employ an enhanced service loader, which is configured to obtain the service type and data pertaining to the host environment, and to load an appropriate flavor of the service based on the service type and the host environment data. In one embodiment, each service object for a storage system application is provided with metadata specifying one or more host environments in which the service object can be run. In a further embodiment, the enhanced service loader can be implemented on a data storage system having an operating system that defines a current host environment of the data storage system.

By providing an enhanced service loader that, in response to a request for a service from a data storage system, can (i) access host environment data from an operating system of the data storage system, (ii) access metadata specifying a host environment(s) in which one or more service objects for a storage system application can be run, and (iii) determine which flavor(s) of the service to load based on the service type and the host environment data, the appropriate flavor(s) of the service can be loaded for execution on the data storage system, thereby avoiding possible hanging of the storage system application and/or error conditions due to a mismatch between a current host environment of the data storage system and the host environment(s) in which a service object can be successfully run.

In certain embodiments, a method of running different flavors of a service provider in different host environments of a data storage system includes determining a current host environment of the data storage system; determining one or more host environments in which one or more services of the service provider can be run, the data storage system including a service loader; and, based on the current host environment of the data storage system and the one or more host environments of the respective services, loading, by the service loader, a respective service among the one or more services for execution on the data storage system. The data storage system has an operating system that includes a configuration file. The method further includes defining, by the operating system, the current host environment of the data storage system in the configuration file. In addition, the method includes implementing the one or more services by one or more classes, respectively; annotating the one or more classes with metadata specifying the one or more host environments in which the one or more services of the service provider can be run; and determining, by the service loader, the one or more host environments in which the one or more services of the service provider can be run based on the metadata.

In certain further embodiments, a data storage system for running different flavors of a service provider in different host environments includes a memory including an operating system and program code, and processing circuitry operative to execute one or more of the operating system and the program code to determine a current host environment of the data storage system; to determine one or more host environments in which one or more services of the service provider can be run; and, based on the current host environment of the data storage system and the one or more host environments of the respective services, to load a respective service among the one or more services for subsequent execution. The operating system has a configuration file. The processing circuitry is further operative to execute one or more of the operating system and the program code to define the current host environment of the data storage system in the configuration file. In addition, the processing circuitry is operative to execute one or more of the operating system and the program code to implement the one or more services by one or more classes, respectively; to annotate the one or more classes with metadata specifying the one or more host environments in which the one or more services of the service provider can be run; and to determine the one or more host environments in which the one or more services of the service provider can be run based on the metadata.

Other features, functions, and aspects of the invention will be evident from the Detailed Description that follows.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 2 is a flow diagram of an exemplary method of running different flavors of a service provider in different host environments, within the storage system environment of FIG. 1a.

DETAILED DESCRIPTION

Improved systems, methods, and techniques are disclosed herein for running different flavors of a service provider in different host environments. Each service is defined not only by a service type, but also a host environment in which the service is to be run. The disclosed techniques employ an enhanced service loader, which is configured to obtain the service type and data pertaining to the host environment, and to load an appropriate flavor of the service based on the service type and the host environment data. By providing an enhanced service loader that, in response to a request for a service from a data storage system, can (i) access host environment data from an operating system of the data storage system, (ii) access metadata specifying a host environment(s) in which service objects for a storage system application can be run, and (iii) determine which flavor(s) of the service to load based on the service type and the host environment data, the appropriate flavor(s) of the service can be loaded for execution onto the data storage system, thereby avoiding possible hanging of the storage system application and/or error conditions due to a mismatch between a current host environment of the data storage system and the host environment(s) in which a service object can be successfully run.

Figure 1A:
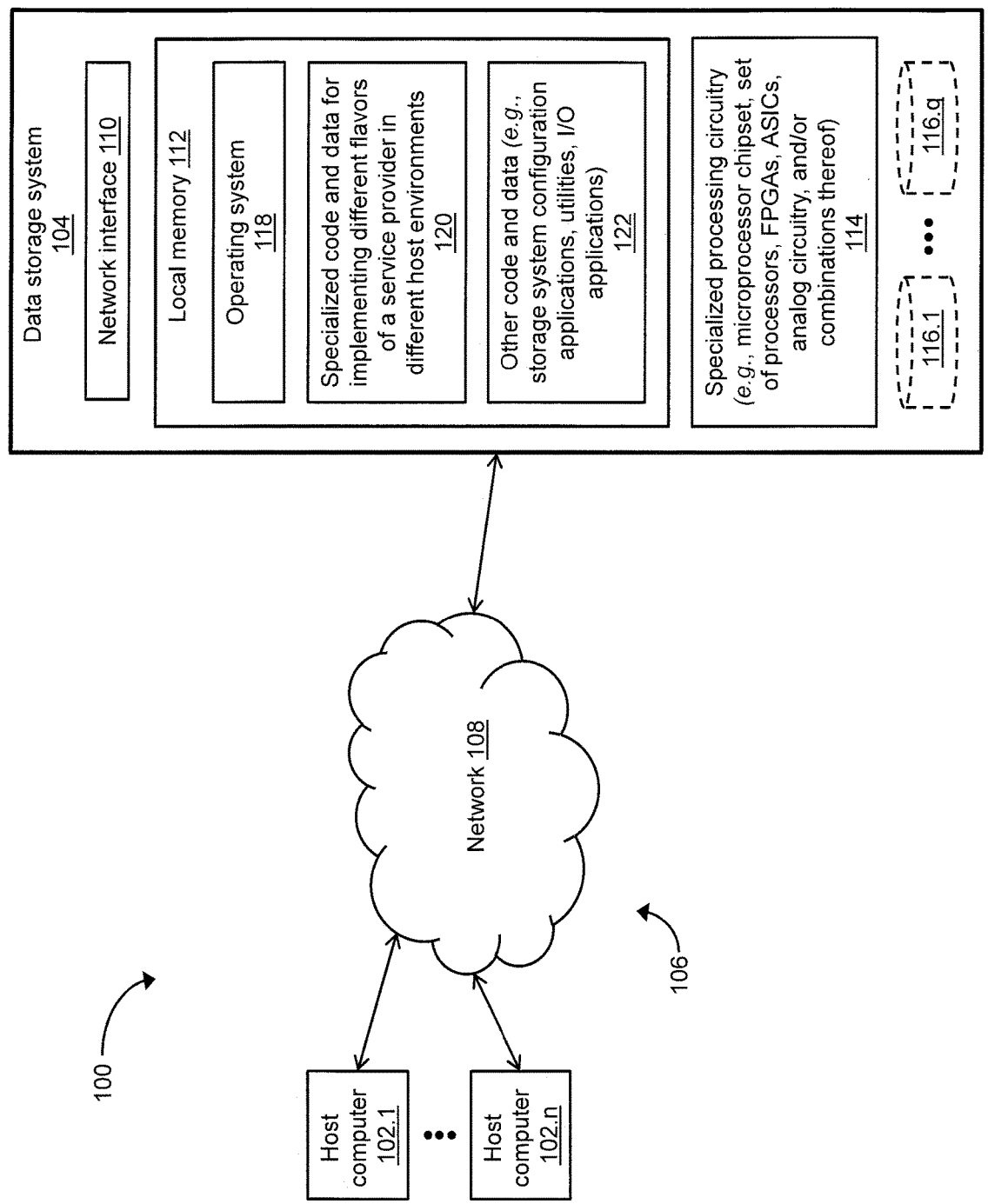
FIG. 1a is a block diagram of an exemplary storage system environment for running different flavors of a service provider in different host environments, including one or more host computers and an exemplary data storage system.

FIG. 1a depicts an illustrative embodiment of an exemplary storage system environment 100 for running different flavors of a service provider in different host environments. As employed herein, the term "service provider" can refer to a specific implementation of a service, and the term "flavor" can refer to a specific implementation of a service tailored to run in a specific environment. As shown in FIG. 1a, the storage system environment 100 can include a data storage system 104 and one or more host computers 102.1, . . . , 102.n communicably coupled to a communications medium 106, which includes at least one network 108. For example, each of the host computers 102.1, . . . , 102.n may be configured as a web server computer, a file server computer, an email server computer, an enterprise server computer, and/or any other suitable computer or computerized device. The respective host computers 102.1, . . . , 102.n can provide input/output (I/O) requests (e.g., small computer system interface (SCSI) commands) to the data storage system 104 over the network 108. Such I/O requests can direct the data storage system 104 to store and/or retrieve data blocks from logical storage units (LUNs) and/or virtual volumes (VVOLs) on behalf of the respective host computers 102.1, . . . , 102.n.

The communications medium 106 including the network 108 can be configured to interconnect the respective host computers 102.1, . . . , 102.n and the data storage system 104 to enable them to communicate and exchange signaling with one another. As shown in FIG. 1a, at least a portion of the communications medium 106 is illustrated as a "cloud" to indicate that the communications medium 106 can have a variety of different topologies, including, but not limited to, a backbone topology, a hub-and-spoke topology, a loop topology, an irregular topology, or any suitable combination thereof. The communications medium 106 can also include, but is not limited to, copper-based data communications devices and cabling, fiber optic-based devices and cabling, wireless devices, or any suitable combination thereof. In addition, the communications medium 106 can be configured to support storage area network (SAN)-based communications, local area network (LAN)-based communications, cellular communications, wide area network (WAN)-based communications, distributed infrastructure communications, and so on, or any suitable combination thereof.

As shown in FIG. 1a, the data storage system 104 can include a network interface 110, a local memory 112, specialized processing circuitry 114, and one or more data storage devices 116.1, . . . , 116.q. The network interface 110 can be configured to connect the data storage system 104 as a node on the network 108, enabling access to/from the respective host computers 102.1, . . . , 102.n. Such access over the network 108 can be SAN-based, Internet protocol (IP)-based, cellular-based, cable-based, fiber optic-based, cloud-based, wireless, and so on, or any suitable combination thereof. The local memory 112 can be configured to include volatile storage (e.g., dynamic random access memory (DRAM), static random access memory (SRAM)), as well as non-volatile storage (e.g., magnetic memory, flash memory).

The local memory 112 (see FIG. 1a) of the data storage system 104 can be configured to store a variety of software constructs, including an operating system 118, specialized code and data 120, and other code and data 122. The specialized code and data 120 can include one or more sets of instructions that direct the specialized processing circuitry 114 to implement the systems, methods, and techniques for running different flavors of a service provider in different host environments, as described herein. The other code and data 122 can include one or more further sets of instructions that direct the specialized processing circuitry 114 to perform input/output (I/O) operations involving the respective storage devices 116.1, . . . , 116.q, as well as various other operations involving, for example, administrative tools, utilities, other user-level applications, and so on. The specialized processing circuitry 120 is configured to operate in accordance with the specialized code and data 120 and/or the other code and data 122 stored in the local memory 112. It is noted that the specialized processing circuitry 114 can be implemented in a variety of ways, using one or more processors (or cores) running specialized software, one or more application specific integrated circuits (ASICs), one or more field programmable gate arrays (FPGAs), one or more discrete components, digital circuits, analog circuits, and so on, or any suitable combination thereof.

In the context of the specialized processing circuitry 114 (see FIG. 1a) being implemented using one or more processors running specialized software, a computer program product can be configured to deliver all or a portion(s) of the specialized code and data 120 and/or other code and data 122 to the specialized processing circuitry 114. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by one or more of the processors, perform the methods described herein. Such media may be considered to be articles of manufacture, and may be transportable from one data storage system to another data storage system.

The data storage devices 116.1, . . . , 116.q (see FIG. 1a) of the data storage system 104 can include one or more of volatile memory, non-volatile memory, hard disk drives (HDDs), solid state drives (SSDs), tape drives, optical drives, network attached storage (NAS) devices, SAN devices, and so on. Each data storage device 116.1, . . . , 116.q can be locally attached to an I/O channel of the data storage system 104, while also being accessible over the network 108. Further, each data storage device 116.1, . . . , 116.q can be a single stand-alone component, or a system of data storage devices such as a collection of drives (e.g., a redundant array of inexpensive disks (RAID) group) logically operating together as a unified storage device to provide a desired level of data protection through redundancy. Such a RAID group can be configured to store large quantities of data for access by one or more processors operative to handle requests for allocation, as well as host I/O requests. It is noted that the data storage devices 116.1, . . . , 116.q are illustrated in FIG. 1a in phantom to indicate that the data storage system 104 can be configured to run different flavors of a service provider in different host environments, including, but not limited to, host environments in which the data storage system 104 (i) has access to a backend array (i.e., the physical storage of the data storage system 104, including the data storage devices 116.1, . . . , 116.q) (also referred to herein as the "ON-ARRAY environment"), (ii) does not have access to the backend array (also referred to herein as the "OFF-ARRAY environment"), and (iii) may or may not have access to the backend array for running a demo application (also referred to herein as the "DEMO APPLICATION environment").

Figure 1B:
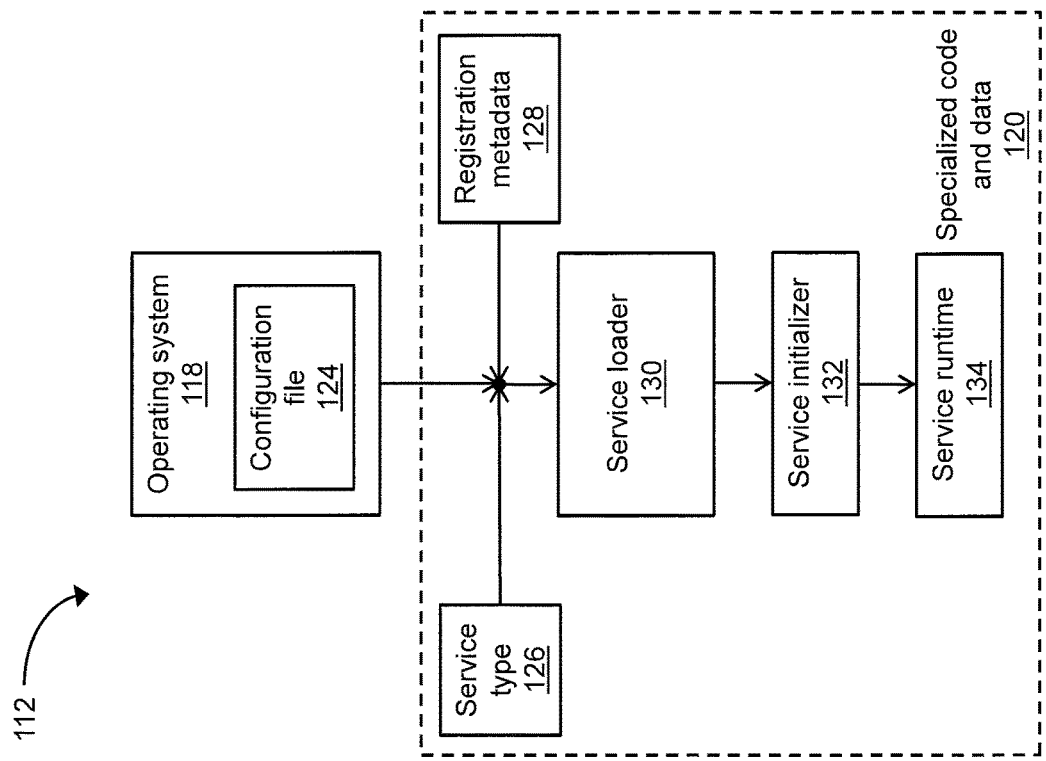
FIG. 1b is a block diagram of an operating system and specialized code and data implemented in the data storage system of FIG. 1a, in which the operating system includes a configuration file and the specialized code and data include a service loader, a service type, and registration metadata.

FIG. 1b depicts several of the software constructs stored in the local memory 112 of the data storage system 104, including the operating system 118 and the specialized code and data 120. As shown in FIG. 1b, the operating system 118 can include a configuration file 124, and the specialized code and data 120 can include a service type 126, registration metadata 128, a service loader 130, a service initializer 132, and a service runtime component 134. The data storage system 104 can employ such software constructs in a service-oriented architecture environment to obtain, or otherwise load at runtime, one or more service objects for a storage system application, such as a runtime application in an ON-ARRAY environment, a test application in an OFF-ARRAY environment, and a demo application in a DEMO APPLICATION environment. In certain embodiments, the current host environment of the data storage system 104 (e.g., ON-ARRAY environment, OFF-ARRAY environment, DEMO APPLICATION environment) can be defined in the configuration file 124 of the operating system 118. Further, each service object for the storage system application can be provided with registration metadata specifying the host environment(s) (e.g., ON-ARRAY environment, OFF-ARRAY environment, DEMO APPLICATION environment) in which the service object can be run. The data storage system 104 can employ the service loader 130 to obtain the current host environment defined in the configuration file 124, the service type 126, and the registration metadata 128. Based on the service type 126, the host environment(s) of the service object, and the current host environment of the data storage system 104, the data storage system 104 can direct the service loader 130 to load an appropriate flavor of the service represented by the service type 126, as well as direct the service initializer 132 to initialize a service runtime 134 for the service.

Figure 1C:
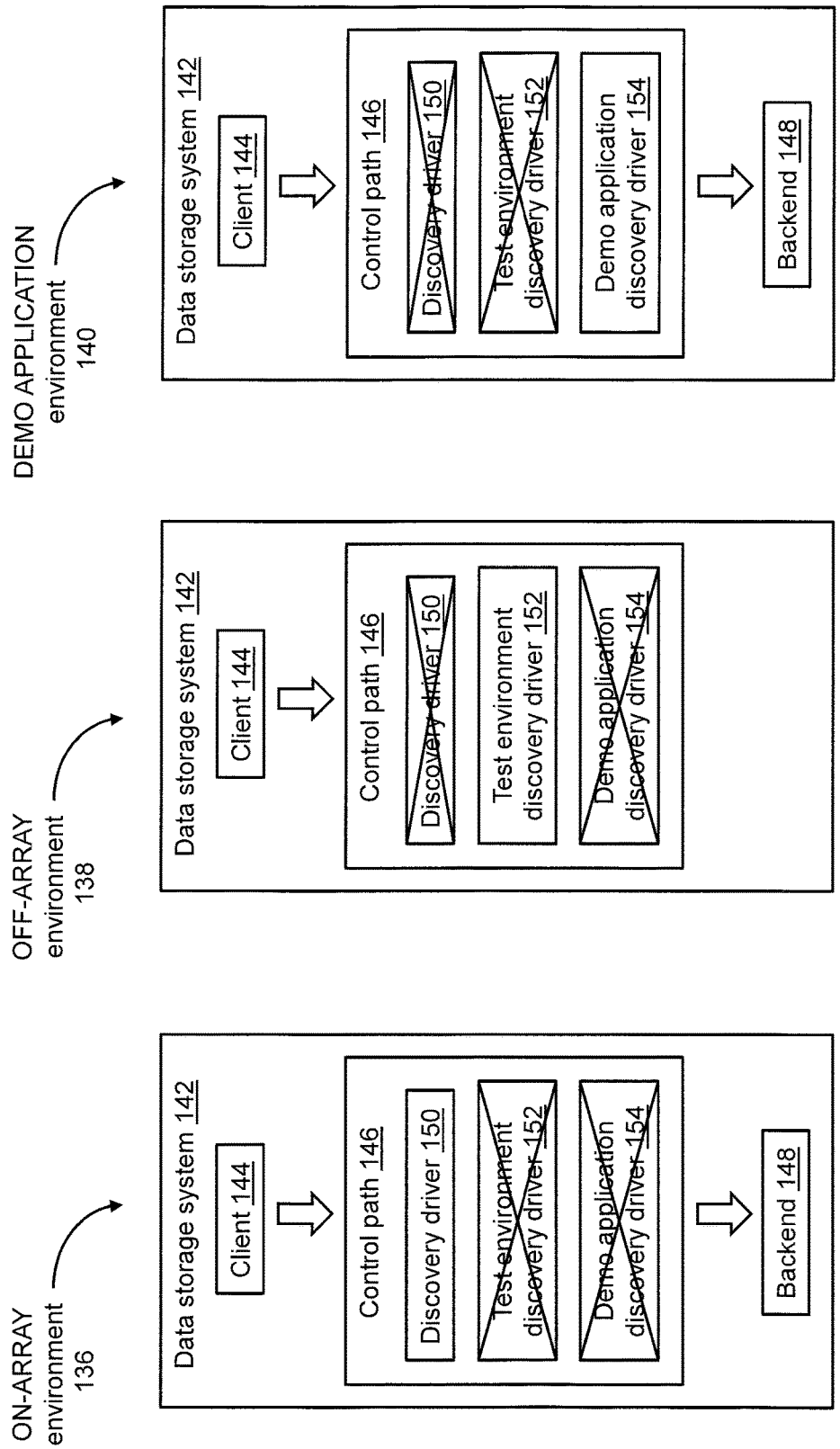
FIG. 1c is a block diagram of a representative data storage system configured to load different flavor implementations of a service tailored to run in an ON-ARRAY environment, an OFF-ARRAY environment, and a DEMO APPLICATION environment.

FIG. 1c depicts a representative data storage system 142 configured to load different flavor implementations of a service tailored to run in an ON-ARRAY environment 136, an OFF-ARRAY environment 138, and a DEMO APPLICATION environment 140. As shown in FIG. 1c, the representative data storage system 142 can include a client portion 144, a control path portion 146, as well as an optional backend array 148 based on whether or not the host environment of the data storage system 142 corresponds to the OFF-ARRAY environment 138. The control path portion 146 of the data storage system 142 can include a plurality of loadable discovery driver applications, such as a discovery driver 150, a test environment discovery driver 152, and a demo application discovery driver 154.

As described herein, based at least on the service type and the current host environment of the data storage system, the service loader 130 (see FIG. 1b) can be directed to load an appropriate flavor of the service represented by the service type. Accordingly, in the event the current host environment of the data storage system 142 (see FIG. 1c) corresponds to the ON-ARRAY environment 136, the data storage system 142 can direct the service loader 130 to load an appropriate flavor of the service that involves only the discovery driver 150. As shown in FIG. 1c with reference to the ON-ARRAY environment 136, a cross "X" is placed on each of the test environment discovery driver 152 and the demo application discovery driver 154, thereby indicating that the service loader 130 is directed to load the discovery driver 150, but is not directed to load either the test environment discovery driver 152 or the demo application discovery driver 154. Once loaded in the ON-ARRAY environment 136 of the data storage system 142, the discovery driver 150 can proceed to communicate with the backend array 148, and gather information pertaining to existing storage objects of the data storage system 142.

As shown in FIG. 1c with reference to the OFF-ARRAY environment 138, a cross "X" is placed on each of the discovery driver 150 and the demo application discovery driver 154, thereby indicating that the service loader 130 is directed to load the test environment discovery driver 152, but is not directed to load either the discovery driver 150 or the demo application discovery driver 154. Because the test environment discovery driver 152 does not require the physical storage of the backend array 148 to function correctly, the backend array 148 is omitted from the representation of the data storage system 142 in the OFF-ARRAY environment 138.

As further shown in FIG. 1c with reference to the DEMO APPLICATION environment 140, a cross "X" is placed on each of the discovery driver 150 and the test environment discovery driver 152, thereby indicating that the service loader 130 is directed to load the demo application discovery driver 154, but is not directed to load either the discovery driver 150 or the test environment discovery driver 152. Once loaded in the DEMO APPLICATION environment 140 of the data storage system 142, the demo application discovery driver 154 can proceed to load a special set of storage objects for demonstration purposes.

The disclosed systems, methods, and techniques, as well as many of their attendant advantages, will be further understood with reference to the following illustrative example, and FIGS. 1a and 1b. In this example, the operating system 118 (see FIG. 1b) of the data storage system 104 can be implemented with the Linux operating system, and the specialized code and data 120 can be implemented in the Java™ programming language. It is noted, however, that any other suitable operating system and/or programming language may alternatively be employed.

The following description pertaining to the Java™ programming language is intended to provide context to this illustrative example. The Java™ programming language can provide a platform for the development and deployment of reusable components such as Java™ class files and Java™ interfaces. A Java™ class file is a compiled Java™ source file that can be generated for each class in the Java™ source file. A Java™ interface defines operations (also known as "methods") that the class can implement. Computer programs written in the Java™ programming language can be packaged into a Java™ archive file (also referred to herein as a "JAR file(s)"). A JAR file has a file format that can be used to bundle components required by a Java™ computer program. Such a JAR file can have a subdirectory of meta-information named "META-INF". The META-INF subdirectory can, in turn, contain other subdirectories, computer programs, and/or files for meta-information that may optionally be included in the archive. For example, the name of a Java™ class that implements a particular service may be stored in a service provider file within a subdirectory named "META-INF/services".

With reference to the Java™ programming language, the term "service" can correspond to an abstract class. Further, each service can have a corresponding service provider that offers the service. Such a service provider can correspond to a specific implementation of the service. The META-INF/services subdirectory can contain at least one service provider file that specifies one or more service providers for a particular service (i.e., one or more specific implementations of the service). It is noted that there can be multiple JAR files, each having at least one service provider file that specifies one or more service providers for each service. In this case, a service discovery tool can be used to determine which service provider(s) can implement a particular service.

As described herein, the current host environment of the data storage system 104 (e.g., ON-ARRAY environment, OFF-ARRAY environment, DEMO APPLICATION environment) (see FIG. 1a) can be defined in the configuration file 124 of the operating system 118. In this example, having implemented the operating system 118 with the Linux operating system, the current host environment (e.g., the ON-ARRAY environment) can be defined in the configuration file 124, as follows:

export JAVA_TOOL_OPTIONS="–
        Djiff.registration.ON_ARRAY=LOAD".                     (1)

As further described herein, each service object for a storage system application (e.g., runtime application, test application, demo application) can be provided with metadata specifying the host environment(s) (e.g., ON-ARRAY environment, OFF-ARRAY environment, and/or DEMO APPLICATION environment) in which the service object can be run. In this example, having implemented the specialized code and data 120 in the Java™ programming language, Java™ classes (e.g., registry classes) that implement particular services can be annotated with such metadata (e.g., the registration metadata 128), as follows:

import static com.emc.ctd.jiff.frmk.registration.Reg-
        istration.Category.OFF_ARRAY;

import static com.emc.ctd.jiff.frmk.registration.Reg-
        istration.Category.ON_ARRAY;

import com.emc.ctd.jiff.frmk.registration.AppRegis-
        try;

import com.emc.ctd.jiff.frmk.registration.Registra-
        tion;

@Registration(ON_ARRAY)

@Registration(OFF_ARRAY)

public final class JobManagerRegistry implements
        AppRegistry.                                           (2)

As still further described herein, the service loader 130 can be used to obtain the service type 126. In this example, having implemented the specialized code and data 120 in the Java™ programming language, the name of a service provider file (i.e., the abstract type) storing the Java™ class that implements a particular service can be expressed, as follows:

src/main/resources/META-INF/services/

├── com.emc.ctd.jiff.frmk.registration.AppRegistry

└── com.emc.ctd.jiff.frmk.registration.GlobalRegis-
        tration.                                               (3)

Further, one or more concrete types (i.e., types that can be instantiated) can be listed in the contents of the service provider file, as follows:

com.emc.ctd.jiff.frmk.registration.AppRegistry:

com.emc.ctd.jiff.frmk.discovery.DiscoveryManager-
        Registry com.emc.ctd.jiff.frmk.core.systemrecovery.SystemRe-
        coveryManagerRegistry com.emc.ctd.jiff.frmk.core.system.SystemRegistry com.emc.ctd.jiff.frmk.core.job.JobManagerRegistry com.emc.ctd.jiff.frmk.comm.Communication-
        EcomTaskRegistry.                                      (4)

In this example, once the operating system 118 boots up and initializes, it can read the configuration file 124 to determine the current host environment of the data storage system 104. Having defined the current host environment in the configuration file 124 in accordance with the foregoing code (corresponding to reference numeral (1)), the operating system 118 can determine that the current host environment corresponds to the ON-ARRAY environment. The operating system 118 can also set a global variable to indicate that the current host environment is the ON-ARRAY environment. At runtime, the service loader 130 can determine the current host environment (e.g., ON-ARRAY environment) of the data storage system 104 based on the setting of the global variable. Further, the service loader 130 can obtain, in accordance with the foregoing code (corresponding to reference numeral (2)), the registration metadata 128 specifying the host environment(s) (e.g., ON-ARRAY or OFF-ARRAY environment) in which service objects for the storage system application (e.g., runtime application, test application, demo application) can be run, as well as obtain the service type 126 in accordance with the foregoing code (corresponding to reference numerals (3) and (4)). Based on the service type 126, the host environment(s) of the service objects, and the current host environment of the data storage system 104, the service loader 130 can load an appropriate flavor of a particular service (e.g., a flavor of the particular service that can be run in the current host environment (ON-ARRAY environment) of the data storage system 104), as well as direct the service initializer 132 to initialize a service runtime 134 for the particular service.

Figure 2:
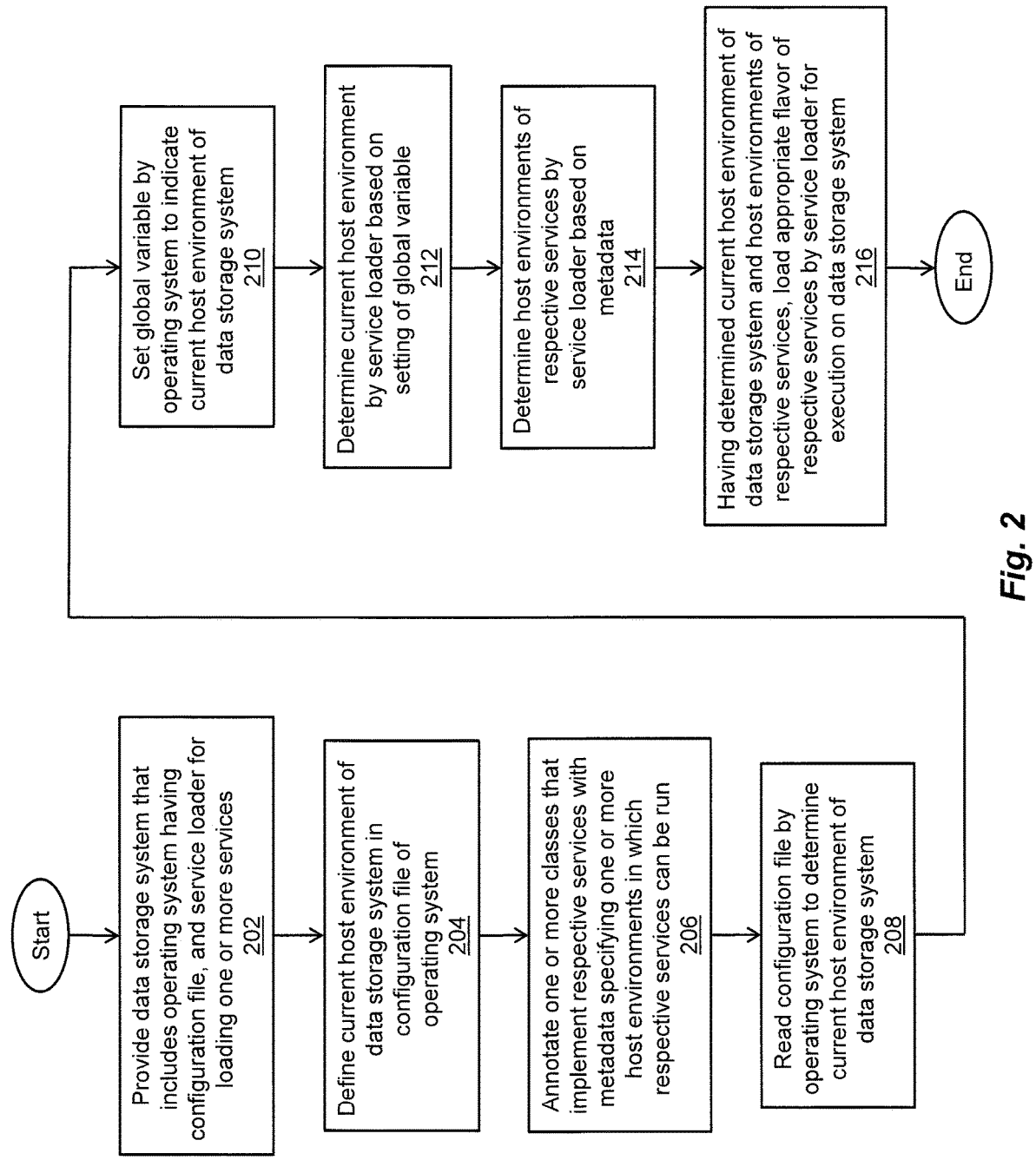

An exemplary method of running different flavors of a service provider in different host environments is described below with reference to FIG. 2. As depicted in block 202 (see FIG. 2), a data storage system is provided that includes an operating system having a configuration file, and a service loader for loading one or more services. As depicted in block 204, a current host environment of the data storage system is defined in the configuration file of the operating system. As depicted in block 206, one or more classes that implement the respective services are annotated with metadata specifying one or more host environments in which the respective services can be run. As depicted in block 208, the configuration file is read by the operating system to determine the current host environment of the data storage system. As depicted in block 210, a global variable is set by the operating system to indicate the current host environment of the data storage system. As depicted in block 212, the current host environment is determined by the service loader based on the setting of the global variable. As depicted in block 214, the host environments of the respective services are determined by the service loader based on the metadata. As depicted in block 216, having determined the current host environment of the data storage system and the host environments of the respective services, an appropriate flavor of the respective services is loaded by the service loader for execution on the data storage system.

Having described the above illustrative embodiments of the disclosed systems, methods, and techniques, other alternative embodiments, modifications, and/or variations may be made. For example, it was described herein that the current host environment of the data storage system 104 (e.g., ON-ARRAY environment, OFF-ARRAY environment, DEMO APPLICATION environment) (see FIG. 1a) can be defined in the configuration file 124 of the operating system 118. In certain alternative embodiments, a global system property specifying the current host environment (e.g., OFF-ARRAY environment) of the data storage system 104 can be set in Java™ test code implementing a storage system application, as follows:

System.setProperty("jiffregistration.OFF_ARRAY", "LOAD"). (5)

While various embodiments of the invention have been particularly shown and described, it will be understood by those skilled in the art that various changes in form and details may be made therein without departing from the scope of the invention as defined by the appended claims.

What is claimed is:

1. A method of running different flavors of a service provider in different host environments of a data storage system, wherein the data storage system stores specialized code and data for implementing, by a service loader of the data storage system, the different flavors of the service provider for providing a same service, each of the different flavors of the service provider tailored to run in different specific host environments, comprising:

receiving, at the data storage system, a service request message;

determining, responsive to the service request message and based on the specialized code and data, a current host environment of the data storage system;

determining, responsive to the service request message and based on the specialized code and data, a respective service type among a plurality of service types of the service provider implemented by the data storage system, each service type corresponding to a specific host environment among the different host environments in which the service provider can be run; and based on the determined current host environment and the determined respective service type, loading, by the service loader, a respective flavor of the service provider among the different flavors of the service provider for execution on the data storage system to process the service request message.

2. The method of claim 1 wherein the data storage system has an operating system, wherein the operating system has a configuration file, and wherein the method further comprises:

defining, by the operating system, the current host environment of the data storage system in the configuration file.

3. The method of claim 2 wherein the determining of the current host environment of the data storage system includes reading the configuration file by the operating system.

4. The method of claim 3 further comprising:

setting, by the operating system, a global variable to indicate the current host environment of the data storage system.

5. The method of claim 4 further comprising:

determining, by the service loader, the current host environment of the data storage system based on the setting of the global variable.

6. The method of claim 1 further comprising:

implementing the different flavors of the service provider by one or more classes, respectively.

7. The method of claim 6 further comprising:

annotating the one or more classes with metadata specifying the different host environments in which the different flavors of the service provider can be run.

8. The method of claim 7 further comprising:

determining the different host environments in which the different flavors of the service provider can be run based on the metadata.

9. The method of claim 6 further comprising:

storing a respective class among the one or more classes that implements the respective flavor of the service provider in a service provider file;

listing the plurality of service types of the service provider in the service provider file; and obtaining the respective service type from the plurality of service types listed in the service provider file.

10. The method of claim 1 wherein the loading of the respective flavor of the service provider includes loading a respective discovery driver among one or more discovery drivers for the different flavors of the service provider, and wherein the method further comprises:

gathering, by the respective discovery driver, information pertaining to zero or more storage objects used during the execution of the respective flavor of the service provider on the data storage system.

11. The method of claim 10 wherein the different host environments in which the different flavors of the service provider can be run include an on-array environment and an off-array environment, wherein the one or more discovery drivers include an on-array environment discovery driver and a test environment discovery driver, wherein each of the determined current host environment and the determined respective service type corresponds to the off-array environment, and wherein the loading of the respective flavor of the service provider includes (i) loading the test environment discovery driver, and (ii) avoiding loading the on-array environment discovery driver.

12. A data storage system for running different flavors of a service provider in different host environments, each of the different flavors of the service provider tailored to run in different specific host environments, comprising:
a memory including an operating system and specialized code and data for implementing, by a service loader of the data storage system, the different flavors of the service provider for providing a same service; and
processing circuitry operative to execute one or more of the operating system and the specialized code and data to:
receive, at the data storage system, a service request message;
determine, responsive to the service request message and based on the specialized code and data, a current host environment of the data storage system;
determine, responsive to the service request message and based on the specialized code and data, a respective service type among a plurality of service types of the service provider implemented by the data storage system, each service type corresponding to a specific host environment among the different host environments in which the service provider can be run; and
based on the determined current host environment and the determined respective service type, load, by the service loader, a respective flavor of the service provider among the different flavors of the service provider for subsequent execution on the data storage system to process the service request message.

13. The data storage system of claim 12 wherein the operating system has a configuration file, and wherein the processing circuitry is further operative to execute one or more of the operating system and the specialized code and data to define the current host environment of the data storage system in the configuration file.

14. The data storage system of claim 13 wherein the processing circuitry is further operative to execute one or more of the operating system and the specialized code and data to read the configuration file to determine the current host environment of the data storage system.

15. The data storage system of claim 14 wherein the processing circuitry is further operative to execute one or more of the operating system and the specialized code and data to set a global variable to indicate the current host environment of the data storage system.

16. The data storage system of claim 15 wherein the processing circuitry is further operative to execute one or more of the operating system and the specialized code and data to determine the current host environment of the data storage system based on the setting of the global variable.

17. The data storage system of claim 12 wherein the processing circuitry is further operative to execute one or more of the operating system and the specialized code and data to implement the different flavors of the service provider by one or more classes, respectively.

18. The data storage system of claim 17 wherein the processing circuitry is further operative to execute one or more of the operating system and the specialized code and data to annotate the one or more classes with metadata specifying the different host environments in which the different flavors of the service provider can be run.

19. The data storage system of claim 18 wherein the processing circuitry is further operative to execute one or more of the operating system and the specialized code and data to determine the different host environments in which the different flavors of the service provider can be run based on the metadata.

20. A computer program product having a non-transitory computer readable medium that stores a set of instructions that, when carried out by computerized circuitry, cause the computerized circuitry to perform a method of running different flavors of a service provider in different host environments of a data storage system, wherein the data storage system stores specialized code and data for implementing, by a service loader of the data storage system, the different flavors of the service provider for providing a same service, each of the different flavors of the service provider tailored to run in different specific host environments, the method comprising:
receiving, at the data storage system, a service request message;
determining, responsive to the service request message and based on the specialized code and data, a current host environment of the data storage system;
determining, responsive to the service request message and based on the specialized code and data, a respective service type among a plurality of service types of the service provider implemented by the data storage system, each service type corresponding to a specific host environment among the different host environments in which the service provider can be run; and
based on the determined current host environment and the determined respective service type, loading a respective flavor of the service provider among the different flavors of the service provider for execution on the data storage system to process the service request message.

21. The computer program product of claim 20 wherein the method further comprises:
implementing the different flavors of the service provider by one or more classes, respectively.

22. The computer program product of claim 21 wherein the method further comprises:
annotating the one or more classes with metadata specifying the different host environments in which the different flavors of the service provider can be run.

23. The computer program product of claim 22 wherein the method further comprises:
determining the different host environments in which the different flavors of the service provider can be run based on the metadata.

* * * * *